UNITED STATES PATENT OFFICE.

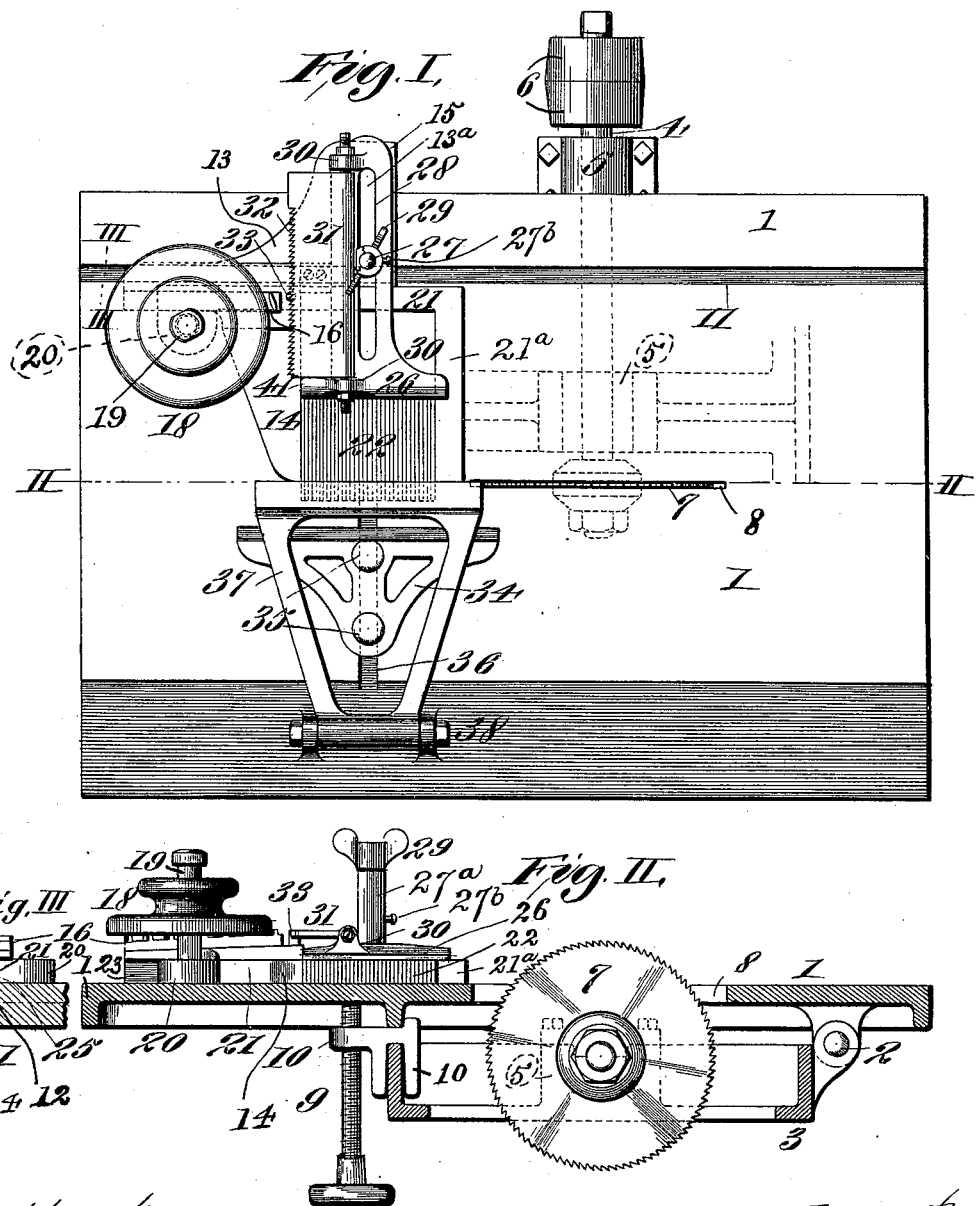

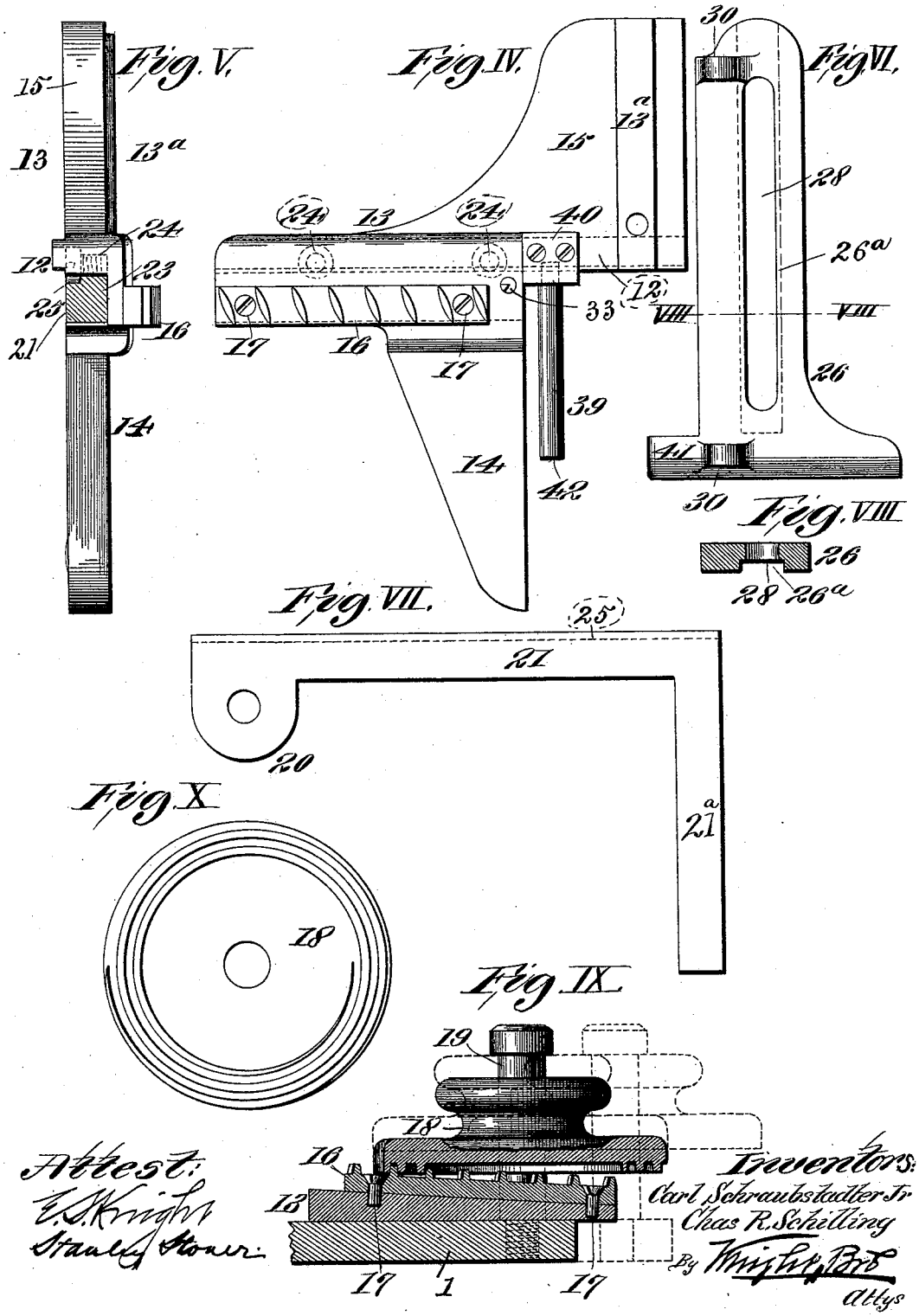

CARL SCHRAUBSTADTER, JR., AND CHARLES R. SCHILLING, OF ST. LOUIS, MISSOURI, ASSIGNORS TO THE WESTERN ENGRAVERS' SUPPLY COMPANY, OF SAME PLACE.

MACHINE FOR DRESSING PRINTERS' BLOCKS.

SPECIFICATION forming part of Letters Patent No. 586,917, dated July 20, 1897.

Application filed December 21, 1896. Serial No. 616,454. (No model.)

*To all whom it may concern:*

Be it known that we, CARL SCHRAUBSTADTER, Jr., and CHARLES R. SCHILLING, citizens of the United States, residing at the city of St. Louis, in the State of Missouri, have invented a certain new and useful Improvement in Machines for Dressing Printers' Blocks, of which the following is a full, clear, and exact description, reference being had to the accompanying drawings, forming a part of this specification.

Our invention relates to an improved machine for trimming or dressing printers' leads, such as linotype-slugs or other blocks; and our invention consists in features of novelty hereinafter fully described and claimed.

Figure I is a top or plan view of our improved machine. Fig. II is a vertical section taken on line II II, Fig. I. Fig. III is a detail section taken on line III III, Fig. I. Fig. IV is a top or plan view of the slide. Fig. V is an end view of the slide. Fig. VI is a top view of the stop-plate. Fig. VII is a top view of the clamp-plate. Fig. VIII is a transverse section taken on line VIII VIII, Fig. VI. Fig. IX is a detail view, part in vertical section and part in elevation, showing part of the slide and showing the nut having a helical thread for tightening the clamp-plate. Fig. X is a bottom view of the nut.

Referring to the drawings, 1 represents a suitable table connected by a hinge 2 to a base 3, supported by suitable legs. (Not shown.) 4 represents a mandrel supported by the base 3 in suitable journal-boxes 5, located beneath the table. The mandrel is provided with tight and loose pulleys 6 and a saw 7, the latter working upwardly through a slot 8 made in the table 1. The front part of the table rests upon the upper end of a set-screw 9, connected by a bracket 10 to the front edge of the base 3. By adjusting the set-screw the table may be raised or lowered with relation to the saw, so as to leave more or less of the saw exposed above the table to regulate the depth of the cut made by the saw.

11 represents a longitudinal groove made in the upper face of the table to receive a longitudinal projection 12 on the under face of a slide 13. The shape of the slide is illustrated in Figs. IV and V. It is provided with a forwardly-projecting clamp-arm 14, between which and the L-shaped clamp-plate 21 the slugs are held, and with a rearwardly-projecting arm 15, that receives a stop-plate 26.

16 represents a longitudinal inclined rack, secured to the slide by means of screws 17 or otherwise. The teeth of this rack are of elliptical form, so as to present bearing sides, which are arranged in the arc of a circle, forming a segmental thread, into which meshes a helical thread on the lower face of the knob or nut 18, movably mounted on a stem 19, that is tapped into a projection 20, formed on the L-shaped clamp-plate 21. As seen in Fig. I, the stem 19 is located to one side of the rack 16. The knob or nut 18 is capable of being raised vertically, as shown by dotted lines in Fig. IX, so as to be disengaged from the rack 16, and by disengaging the nut from the rack the slide can be moved quickly in either direction, and when the arm 21$^a$ of the clamp-plate is moved up against the slugs 22, after the latter are placed in position, the nut is dropped into engagement with the rack, and by turning the nut the clamp-plate is drawn by force against the slugs, holding them firmly in place between the arm 14 of the slide and the arm of the clamp-plate. The longitudinal bar of the clamp-plate fits in a groove 23 in the under side of the slide (see Fig. V) and is held therein by screws 24, tapped into the slide, and the heads of which lap into a rabbet 25, cut in the adjacent corner of the clamp-plate, as seen in Figs. III and V. By making this connection between the clamp-plate and the slide the movement of the former with respect to the latter in securing the slugs in place is not interfered with, while the clamp-plate and slide are connected together, so that if the latter is removed from the table, as it may be by simply lifting it off, the former will be held in its position in groove 23.

26 represents a stop-plate held to the table 1 by means of a groove 26$^a$ on its under side, fitting over a rib 13$^a$ on the slide, and by means of a post 27, projecting upwardly from the slide and fitting in a slot 28 made in the stop-plate. The post 27 is surrounded by a sleeve 27ª, secured by a set-screw to the post, and is provided with a thumb-nut 29, and by tightening this nut the sleeve bears upon the stop-plate and the stop-plate is held to its adjustment.

30 represents ears formed on the upper surface of the stop-plate, (see Figs. I and VI,) between which is hinged a gage 31, having teeth 32, adapted to engage a toothed pin 33, extending upwardly from the slide. Each tooth 32 represents a pica em or .166 inch in measurement, so that thirteen teeth, for instance, would represent the distance of thirteen ems, the length of an ordinary newspaper-line. In adjusting the stop-plate the gage 31 is thrown up out of engagement with the pin 33 and the stop-plate is moved in or out to the desired point, which is indicated by the proper notch in the gage registering with the pin. When the stop-plate has been moved to its desired position, the thumb-nut 29 is tightened and the stop-plate thus held to its adjustment.

In using the apparatus the stop-plate is first adjusted to proper position—as, for instance, if it is desired to cut the slugs so that they will be thirteen ems in length the stop-plate is set at a point thirteen ems back of the cutting-line of the saw 7. The slugs are then placed up against the arm 14 of the slide with their ends abutting against the stop-plate. When the slugs have all been placed in position, a straight-edge 34 is moved up against their outer ends, so as to assure the abutment of all of the slugs against the stop-plate, this straight-edge resting on the table 1, and held there by screws 35, passing through a tongue fitting in a groove 36 in the table. The next thing to be done is to clamp the slugs so that they will be held firmly between the slide and the clamp-plate. This is done by lifting the nut 18 out of engagement with the rack 16 and pulling the clamp-plate toward the slugs until the arm of the clamp-plate comes up against the slugs. The nut is then dropped into engagement with the rack, and by turning it the clamp-plate is drawn with force up against the slugs, thus firmly clamping the latter in place. It is evident that the entire movement of the clamp-plate might be effected by turning the nut without disengaging it from the rack, but time is saved, especially where a considerable movement is to be imparted to the clamp-plate, by lifting the nut out of engagement with the rack until the end of the clamp-plate comes up against the slugs. When the slugs have been clamped into place, the slide and parts carried by it are moved toward the saw and the ends of the slugs are removed by the saw.

For tabular printing it is necessary to have grooves made in the slugs crosswise of their length to receive the rule. To facilitate this work, we hinge a straight-edge 37 to the table at 38, the front edge of this straight-edge being, when the straight-edge is down, on a line upon which the saw 7 cuts, as shown in Fig. I. In making these grooves for the rule the slugs are placed in position, but before being locked by the clamp-plate they are set out by moving the stop-plate until the point where the groove is to be made registers with the face of the straight-edge 37. The stop-plate is then tightened by the nut 29 and the slugs are turned over with their faces down on the table 1. The clamp-plate is then tightened, and the front edge of the table is raised by means of the set-screw until there is less of the saw 7 exposed above the top of the table than equals the thickness of the slugs or until there is only that part of the saw left above the table that will cut a groove of the depth desired in the slugs. The slide, with its parts, is then moved to carry the slugs across the saw, and it is then moved back, and when the slugs are removed they will, as a whole, have a groove to receive the brass rule.

In printing it is found desirable, for the purpose of providing room for a cut at one end of the printed matter, to cut the slugs of less length than the width of the column, and this space occupied by the cut is frequently of less width than any given number of ems—as, for instance, it may be five and one-half ems or other number of ems with a fraction. As the stop-plate 26 can only be set by the gage 31 to a certain number of ems, we provide our machine with a stop-block 40 on the slide, which is so arranged that the projection 41 on stop-plate 26 exactly engages with it when the stop-plate 26 is brought back to the furthermost limit. Thus in the form of the saw usually constructed by us the greatest width is thirty ems, and when the stop-plate is moved backward so as to engage in the last notch of the gage 31 the surfaces of 40 and 41 will touch. It is obvious that if the stop-plate 26 is now moved forward and a cut is placed between the surfaces 40 and 41, so as to clamp the cut tightly, the saw will cut an amount off the ends of the slugs equal to the width of the cut clamped. Thus if the slugs were thirty ems long and the cut was eight ems long the resulting lines would be twenty-two ems long, and the cut, together with the slugs, would exactly fill out a column thirty ems wide. In order to make this plan available for other column widths, we furnish pins 39. These pins are provided with a shoulder to fit in the block 40, the amount projecting being of such length as will make the distance between the full width when the surfaces 40 and 41 touch and the measure desired. Thus if, when the surfaces 40 and 41 touch, the measure of the gage is thirty ems and if the measure desired is thirteen and one-half ems the pin would have to be sixteen and one-half ems long. When this pin is inserted, cuts clamped between its front surface 42 and the projection 41 on stop-plate 26 will, when the slugs are sawed off, leave the exact amount requisite to make such cuts and the remainder of the slugs fill a thirteen and one-half em column.

We claim as our invention—

1. A machine for dressing printers' blocks, comprising a slide having a forwardly-projecting clamp-arm, a rearwardly-projecting arm, and a rack, an L-shaped clamp-plate having sliding connection with the slide beneath the rack, a stem secured to the clamp-plate adjacent to the rack, a knob having a helical thread for engaging the rack to adjust the clamp-plate with relation to the clamp-arm, and an adjustable stop-plate located on the rearwardly-projecting arm; substantially as described.

2. A machine for dressing printers' blocks, comprising a slide having a forwardly-projecting clamp-arm, a rearwardly-projecting arm and an inclined rack, an L-shaped clamp-plate having sliding connection with the slide beneath the rack, a stem secured to the clamp-plate adjacent to the rack, a movable knob mounted on the stem, having a helical thread for engaging the rack to adjust the clamp-plate with relation to the clamp-arm, and an adjustable stop-plate located on the rearwardly-projecting arm; substantially as described.

3. A machine for dressing printers' blocks, comprising a slide having a tooth-pin, a forwardly-projecting clamp-arm, a rearwardly-projecting arm, and a rack, an L-shaped clamp-plate having sliding connection with the slide beneath the rack, a stem secured to the clamp-plate adjacent to the rack, a knob having a helical thread for engaging the rack to adjust the clamp-plate with relation to the clamp-arm, an adjustable stop-plate located on the rearwardly-projecting arm, and a gage hinged to the stop-plate, having teeth with which the toothed pin engages; substantially as described.

4. A machine for dressing printers' blocks, comprising a slide having a forwardly-projecting clamp-arm, a rearwardly-projecting arm, and a rack, an L-shaped clamp-plate having sliding connection with the slide beneath the rack, a stem secured to the clamp-plate adjacent to the rack, a knob having a helical thread for engaging the rack to adjust the clamp-plate with relation to the clamp-arm, and an adjustable stop-plate located on the rearwardly-projecting arm, and an adjustable straight-edge; substantially as described.

5. A machine for dressing printers' blocks, comprising a slide having a forwardly-projecting clamp-arm, a rearwardly-projecting arm, and a rack, an L-shaped clamp-plate having sliding connection with the slide beneath the rack, a stem secured to the clamp-plate adjacent to the rack, a knob having a helical thread for engaging the rack to adjust the clamp-plate with relation to the clamp-arm, an adjustable stop-plate located on the rearwardly-projecting arm, and the hinged straight-edge; substantially as described.

6. A machine for dressing printers' blocks, comprising a slide having a forwardly-projecting clamp-arm, and a rearwardly-projecting arm, an L-shaped clamp-plate having sliding connection with the slide, means for adjusting the clamp-plate with relation to the clamp-arm, and an adjustable stop-plate located on the rearwardly-projecting arm; substantially as described.

7. A machine for dressing printers' blocks, comprising a slide having a tooth-pin, a forwardly-projecting clamp-arm, and a rearwardly-projecting arm, an L-shaped clamp-plate having sliding connection with the slide, means for adjusting the clamp-plate with relation to the clamp-arm, an adjustable stop-plate located on the rearwardly-projecting arm and a gage hinged to the stop-plate having teeth with which the toothed pin engages; substantially as described.

CARL SCHRAUBSTADTER, JR.
CHARLES R. SCHILLING.

In presence of—
E. S. KNIGHT,
STANLEY STONER.